United States Patent [19]
Eastmond et al.

[11] Patent Number: 5,153,903
[45] Date of Patent: Oct. 6, 1992

[54] INTEGRATED PAGING AND RADIOTELEPHONE SYSTEM HAVING IMPROVED PAGING RELIABILITY

[75] Inventors: Bruce C. Eastmond, Downers Grove, Ill.; Leon Jasinski, Ft. Lauderdale, Fla.

[73] Assignee: Motorola, Inc., Schaumburg, Ill.

[21] Appl. No.: 609,484

[22] Filed: Nov. 5, 1990

[51] Int. Cl.[5] .......................................... H04M 11/00
[52] U.S. Cl. ........................................ 379/57; 379/59
[58] Field of Search ............................ 379/56-59, 379/63, 428; 455/33

[56] References Cited

U.S. PATENT DOCUMENTS

| | | | |
|---|---|---|---|
| 3,906,166 | 9/1975 | Cooper et al. | 379/57 |
| 4,661,972 | 4/1987 | Kai | 379/57 |
| 4,747,122 | 5/1988 | Bhagat et al. | 379/57 |
| 5,040,204 | 8/1991 | Sasaki et al. | 379/57 |

FOREIGN PATENT DOCUMENTS

| | | | |
|---|---|---|---|
| 0212761 | 8/1986 | European Pat. Off. | 379/57 |
| 0389676 | 10/1990 | European Pat. Off. | 379/428 |

Primary Examiner—James L. Dwyer
Assistant Examiner—Dwayne D. Bost
Attorney, Agent, or Firm—Philip P. Macnak; William E. Koch; Thomas G. Berry

[57] ABSTRACT

A communication system is described which comprises a paging terminal for paging message delivery to a paging receiver and a cellular switch for call delivery to a personal communication transceiver. Utilized within the system are portable communication devices combining the personal communication transceiver and the paging receiver. The system is capable of reliably delivering a paging message to the paging receiver by first detecting when a call is in progress with the personal communication transceiver portion of the portable communication device for which a paging message to the paging receiver is intended, and then by inhibiting the transmission of the paging message to the paging receiver during the call to the personal communication transceiver. The paging message is then delivered to the paging receiver upon termination of the cell to the personal communication transceiver.

16 Claims, 9 Drawing Sheets

INTEGRATED PAGING AND RADIOTELEPHONE SYSTEM HAVING IMPROVED PAGING RELIABILITY

BACKGROUND OF THE INVENTION

1. Field of the Invention

This invention relates generally to the field of communication systems, and more particularly to an integrated paging and radiotelephone system providing improved paging reliability.

2. Description of the Prior Art

Paging systems and radiotelephone systems, such as cellular radiotelephone systems have gained widespread acceptance over the years. The trend in growth of these systems has continued to be positive, especially as the technology has evolved to enable reductions in the size and weight of the pagers and portable cellular telephones. Many of the users of portable cellular telephones have continued to be users of pagers, which has resulted in the requirement that those users carry not only a portable cellular telephone, but also a pager. With the trend in technology continuing to enable further miniaturization of both portable cellular telephones and pagers, it is now possible to combine both elements into a single portable unit. Such a combination, however, has been shown to create potential problems not previously encountered when both the portable cellular telephone and the pager were separate units. The close proximity which exists between the paging receiver and the cellular telephone transmitter when the units are combined into a single unit, has been shown to result in significant desensitization of some paging receivers when the portable cellular radiotelephone is in use. The level of the desensitization problem has been shown to be, at least in part, a function of the operating frequency of the paging receiver. As a result receiver desensitization has been found to be especially significant when the pagers are assigned to the 900 MHz frequency band which is close to the cellular transmitter transmit frequencies, and to a lesser extent at other paging frequencies. Such desensitization can result in the loss of pages, when those pages are transmitted during the time a telephone conversation is in progress using the portable cellular telephone. There is, as a result, a need to improve the reliability of the paging transmissions for those pagers which are combined into a single unit with a portable cellular telephone.

SUMMARY OF THE INVENTION

An integrated communication system comprises a paging terminal for paging message delivery to a paging receiver, and a cellular switch for call delivery to a personal communication transceiver. The paging receiver and the personal communication transceiver are combined into a single portable communication device. The apparatus for delivering the paging message to the paging receiver comprises a means for detecting when a call is in progress with the personal communication transceiver portion of the portable communication device for which a paging message to the paging receiver is intended. A second means is provided for inhibiting the transmission of the paging message to the paging receiver during the call to the personal communication transceiver. A third means is then provided for delivering the paging message to the paging receiver upon termination of the call to the personal communication transceiver.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

Figure 1:
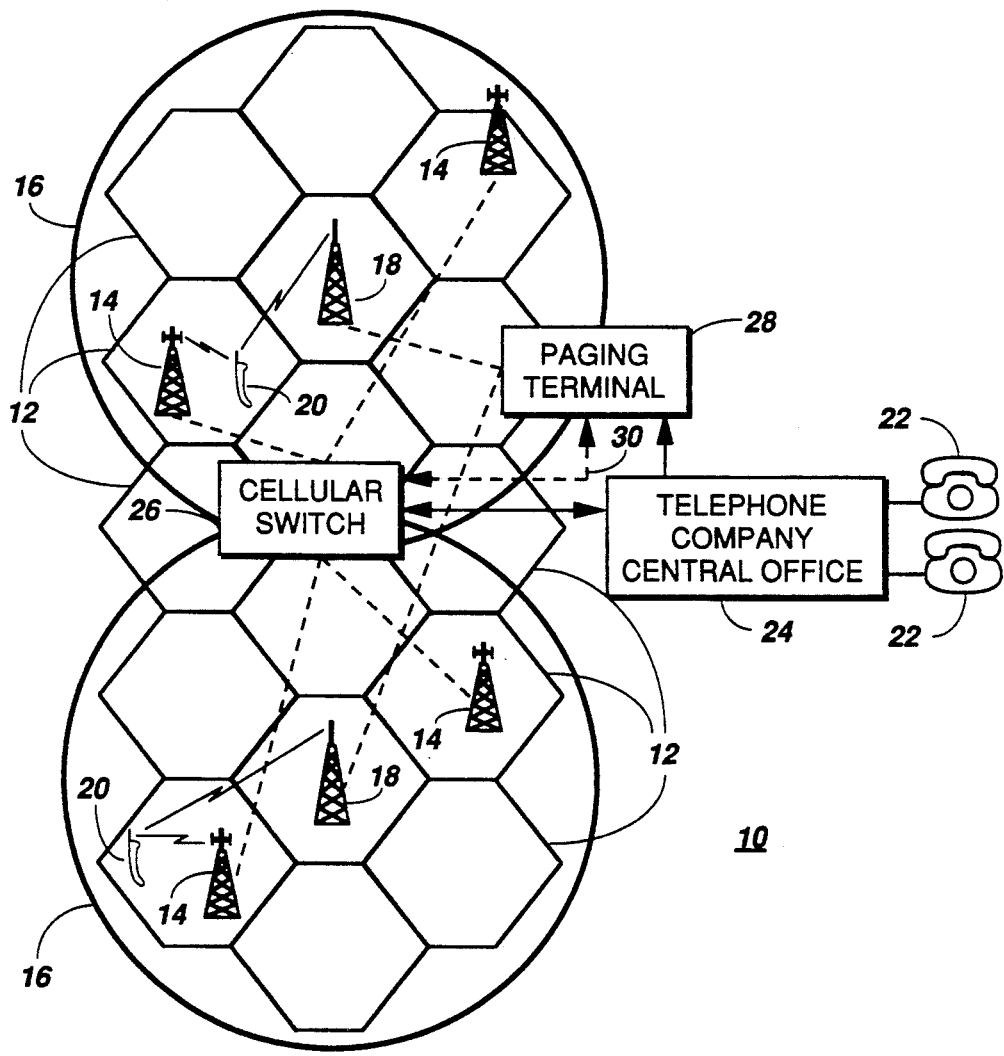
FIG. 1 is a pictorial diagram of an integrated paging and radiotelephone system in accordance with the present invention.

FIGS. 1 through 7 illustrate the preferred embodiment of the present invention, an apparatus and method for reliably delivery a paging message to a paging receiver which is combined with a portable communication device which includes a personal communication transceiver, or cellular radiotelephone. Referring to FIG. 1, a pictorial diagram of an integrated paging and radiotelephone system 10 in accordance with the present invention. The system 10 includes a plurality of cellular transmission regions 12 each of which includes an antenna tower and base stations 14 utilized in the transmission of calls to the cellular radiotelephones 20, or other personal communication transceivers, such as CT2 handset transceivers combined with paging receivers. It will be appreciated the antenna tower and base stations 14 are associated with each of the plurality of cellular transmission regions 12, although only four are being shown for the sake of clarity. The transmission of calls to the cellular radiotelephones 20 from the antenna and base stations 14 within each cellular transmission region 12 is well known in the art.

Also shown in FIG. 1 are a number of paging transmission regions 16, two of which are being shown, and which overlap a number of the cellular transmission regions 12. In the example shown, each paging transmission region 16 overlaps approximately ten cellular transmission regions 12, although it will be appreciated that the actual number of regions which are overlapped is dependent on the actual size of each cellular transmission region 12 relative to each overlapping paging transmission region 16. Each paging transmission region 16 includes an antenna and base station 18 which is located substantially within the center of the transmission region.

Calls directed to the cellular radiotelephone portion of the portable communication device 20 are placed by callers using the telephone system, which includes the callers telephone 22 which couples through the public switched telephone network to the telephone company central office 24. From the telephone company central office 24, the calls are coupled via phone lines to a cellular switch 26. The cellular switch 26 selectively couples the calls via phones lines, or link transmitters and receivers (not shown), to the appropriate antenna tower and cellular base station 14 within the cellular transmission region 12 in which the cellular radiotelephone is located for which the call is directed. The operation of a cellular system for the transmission of calls between a land line based telephone and a portable cellular radiotelephone is well known in the art. One such cellular system is described in U.S. Pat. No. 3,906,166 to Cooper et al, entitled "Radio Telephone System" which is assigned to the assignee of the present invention and which is hereby incorporated by reference herein.

Paging messages directed to the paging receivers, or pager portion, of the portable communication device 20 are placed by callers also using the telephone system, which includes the callers telephone 22 which couples through the public switched telephone network to the telephone company central office 24. From the telephone company central office 24, the paging messages are coupled via phone lines to a paging terminal 28 which processes the paging message for transmission. After the paging messages have been processed for transmission, the processed paging messages are coupled via phone lines, or link transmitters and receivers (not shown), to the antenna and base stations 18 in each paging transmission region 16. The paging messages are then transmitted, generally in a simulcast fashion from each of the antenna and paging base stations 18 throughout the region covered by the paging system.

As indicated above, prior art paging systems and cellular systems have operated independently, handling calls for the cellular radiotelephones and paging messages for the paging receivers operating within each of the respective systems. Such independent operation, however, can pose problems when the paging receiver is combined with the cellular radiotelephone. In the preferred embodiment of the present invention, a communication link 30 is established between the paging terminal 28 and the cellular switch 26 which enables the paging terminal to determine when the cellular radiotelephone portion of the portable communication device 20 is in use for which a paging message is intended. The apparatus to enable the paging terminal and cellular switch to communicate, thereby to improve the reliability of the paging message transmission will be described in greater detail below.

Figure 2:
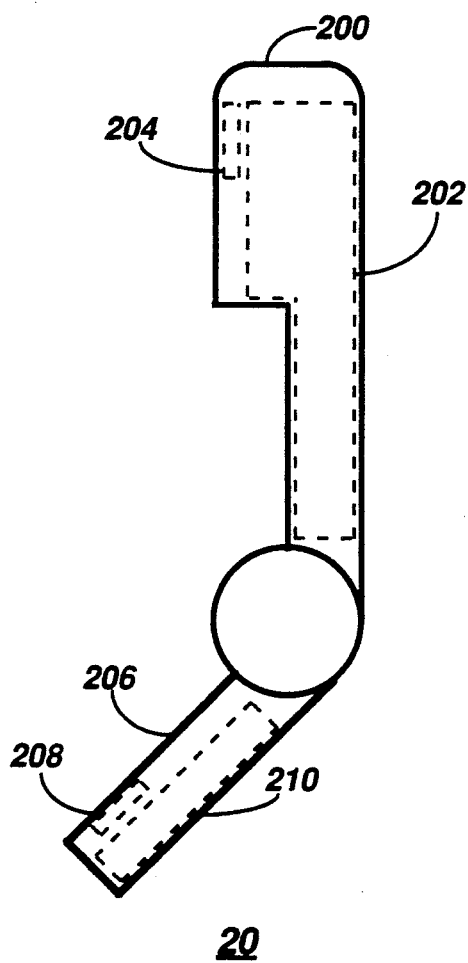
FIG. 2 is a pictorial diagram of an integrated paging receiver and radiotelephone unit suitable for use with the present invention.

FIG. 2 is a pictorial diagram of a portable communication device 20 which integrates the paging receiver and cellular radiotelephone. The mechanical configuration of the portable communication device 20 is for example only, and it will be appreciated that other mechanical configurations can be provided which combine the paging receiver and the cellular radiotelephone functions. As shown in FIG. 2, a portable communication device suitable for use with the present invention is a small hand held device having a mechanical configuration similar to the MICROTAC ™ cellular hand held radiotelephone manufactured by Motorola. In the upper portion 200 of the housing is located the cellular receiver/transmitter electronics, antenna, and battery in an area defined as 202. A transducer is also located within an area 204 of the upper portion 200 of the housing. The transducer enables the user to listen to the call. In a lower, hinged portion 206 of the housing 200, a microphone 208 is positioned, enabling the user to communicate with the caller. Also located within the lower, hinged portion 206 of the housing 200 is the paging receiver electronics, located within an area 210. It is the close proximity of the paging receiver electronics and antenna located within area 210 and the cellular transmitter/receiver electronics and antenna located within area 202 which can result in a significant desensitization of the paging receiver when the cellular radiotelephone is in use, resulting potentially in loss of calls directed to the paging receiver.

Figure 3:
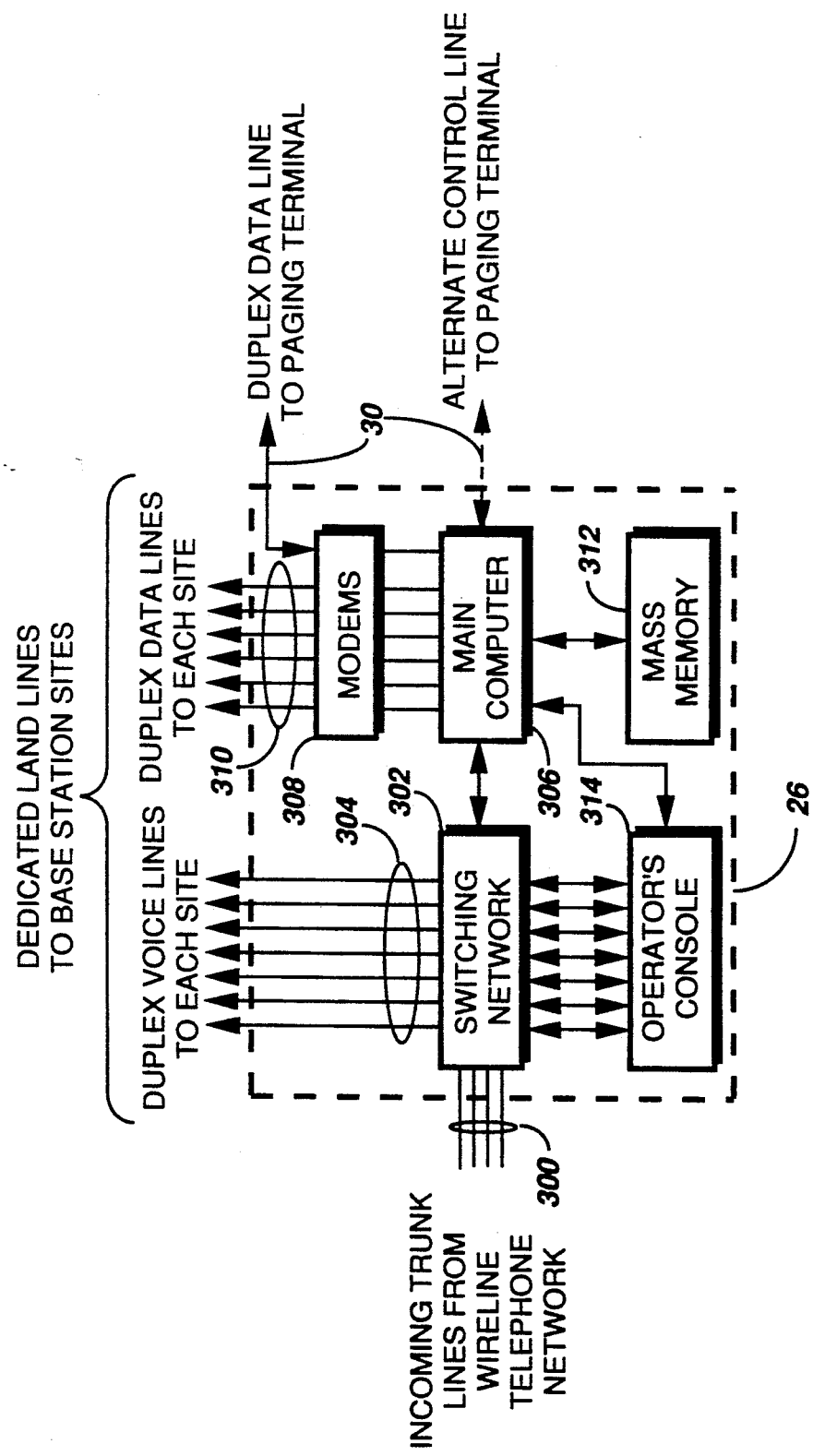
FIG. 3 is an electrical block diagram of a cellular switch suitable for use with the present invention.

FIG. 3 is an electrical block diagram of a cellular switch 26 suitable for use with the present invention. In general, the operation of cellular switches is well known in the art, so only a brief description is being provided herein. Calls originated from telephones located throughout the public switched telephone network are coupled through the telephone company central office through phone lines 300 into the cellular switch switching network 302. The switching network 302 selectively couples the calls to the cellular sites in which the cellular radiotelephone is located using duplex voice telephone lines 304 to each cellular site within the cellular system. The location of each of the cellular radiotelephones within the cellular system is communicated to the cellular switch 26 via duplex data phone lines 310 which couple location data modulated as modem tones to modems 308. The modems recover the location data which is then coupled from the modems to a main computer 306 which controls the call routing through the switching network 302. A mass memory 312 also couples to the main computer 306 containing such information as cellular radiotelephone identification information, billing information, and other information necessary for the operation of the cellular system. An operator's console 314 is coupled to the main computer 306 to enable control of the operation of the cellular system, and to provide access to, and alteration of, information stored in the mass memory 312. The operator's console 314 also couples to the switching network 302 to provide monitoring of the operation of the system.

The cellular switch 26 of the present invention provides a means of communication to the associated paging system. In one embodiment, to be described in detail below, the paging terminal determines the status of the cellular radiotelephone through "busy" signals generated at the telephone company central office. In a second embodiment shown in FIG. 3, the communication between the paging terminal and the cellular switch is accomplished using a dedicated duplex data telephone line 30 when the paging terminal and the cellular switch are remotely located from each other. The duplex data line 30 may also be part of a local area data network (LAN) when the paging terminal and the cellular switch are closely located to each other. Using the dedicated duplex data telephone line 30, information regarding the portable communication device for which a paging message is intended is transmitted from the paging terminal to the cellular switch to enable the paging terminal to determine when the cellular radiotelephone is actively engaged in a call. When the paging terminal determines that the cellular radiotelephone is actively engaged in a call, the paging message transmission is inhibited, as will be described in detail below.

Figure 4:
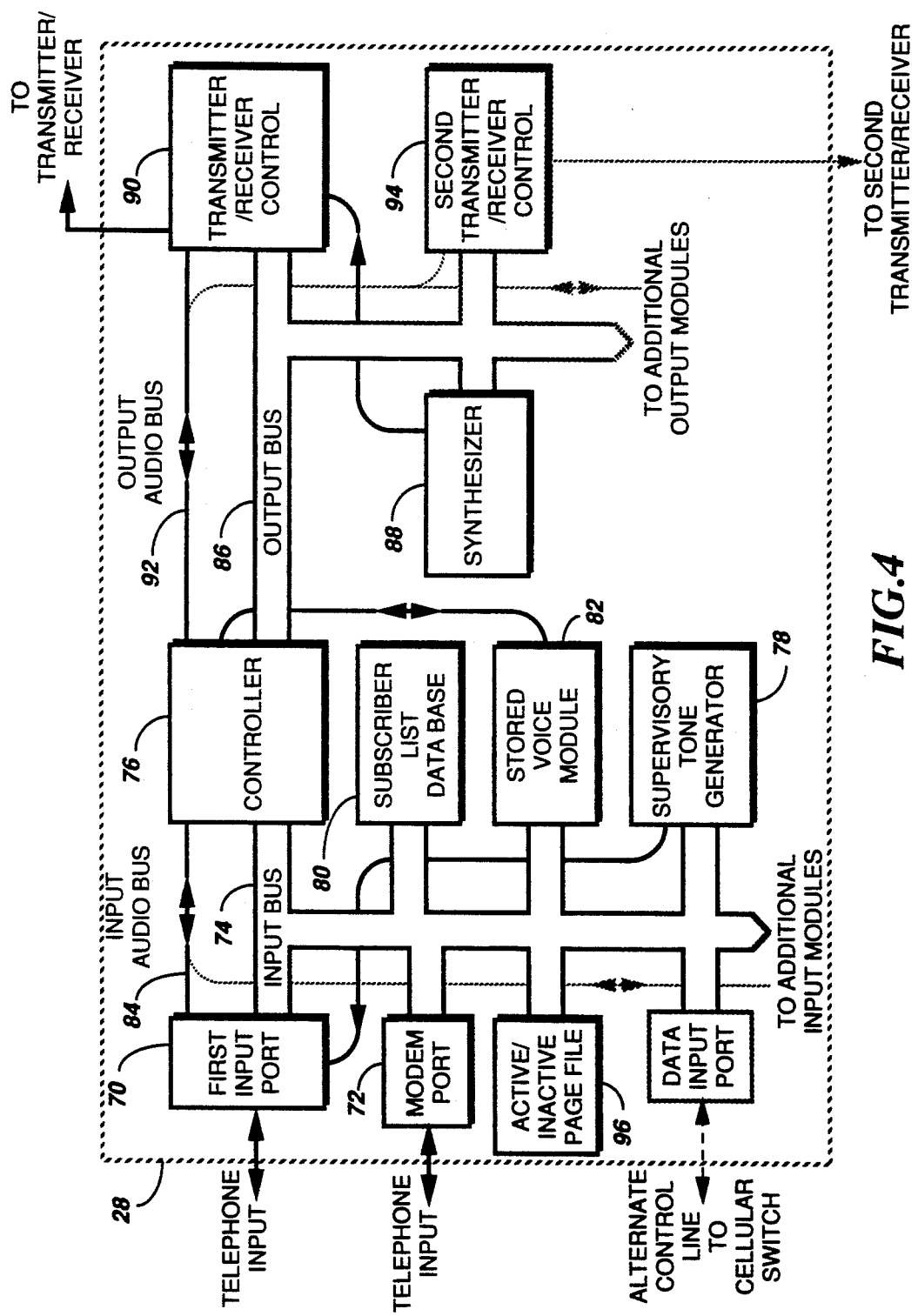
FIG. 4 is an electrical block diagram of a paging terminal suitable for use with the present invention.

FIG. 4 is an electrical block diagram of a paging terminal suitable for use with the present invention. In general, operation of paging terminals are well known to one of ordinary skill in the art, so only a brief description of the operation is provided herein. One or more input ports 70 are connected to the public switched telephone system enabling paging messages to be entered by a caller using such page origination devices as a telephone to access the paging terminal 28. When a call is received by the paging terminal 28, an output is generated on the digital input bus 74 which is coupled to the controller 76. The controller 76, through the digital input bus 74, enables the supervisory tone generator 78 to generate an acknowledgment tone which is coupled to the first input port 70. This tone is communicated to the caller through the telephone circuit and indicates the paging terminal is ready to accept the pager number of the paging receiver to be paged. As is well known in the art, the number of digits to be entered for the pager number is dependent upon the number of pagers operational within the system, such as three digits for a 1000 pager system. The three digits, entered as DTMF tones from a touch-tone telephone when received through the first input port 70, are processed by a DTMF to binary converter to provide the digital data to be processed by the controller 76. The controller 76 checks the received pager number with the subscriber list data base 80, which is generally a nonvolatile memory such as a hard disk or EEPROM memory which may be periodically altered and updated as required for the number of subscribers on the system, to determine the actual pager address code to be transmitted to the selected paging receiver.

The subscriber list data base also includes information on those paging receivers which are combined with cellular radiotelephones. When the controller determines from the subscriber list data base 80 that the paging receiver is combined with a cellular radiotelephone, a flag is set to indicate communication to the cellular switch is required prior to the transmission of the paging message, and information identifying the cellular radiotelephone portion of the portable communication device is recovered.

In a first embodiment of the present invention, the controller 76 through the digital input bus 74 initiates contact with the cellular switch using a second input port (not shown). The second input port is configured to generate a sequence of DTMF tones corresponding to the cellular radiotelephone phone number. If a call is being placed to the cellular radiotelephone, a busy signal will be generated at the telephone company central office. The busy signal is decoded by a detector circuit within the input port, and the detected output is sensed by the controller which in turn enables supervisory tone generator 78 to generate a second acknowledgment tone, such as a "busy" tone, indicating to the caller that transmission of the paging message will be delayed. Controller 76 then initiates the generation of a third acknowledgment tone indicating to the caller to speak the message, as in a voice system, or to enter the message data, as in a numeric or alphanumeric message. It will be appreciated by one of ordinary skill in the art that voice leadthrough responses may be generated in lieu of acknowledgment tones directing the caller to enter the pager number, telephone number and message, and to indicate that the paging message transmission is to be delayed.

As described above, the controller 76 through the digital input bus 74 can, in a second embodiment of the present invention, initiate contact with the cellular switch using the modem port 72. When communication with the cellular switch is established through the modem port 72, the controller transmits the information identifying the cellular radiotelephone to the cellular switch, which in turn provides information on the call status of the cellular radiotelephone.

When the transmission of the paging message is to be delayed, the controller 76, places the message data in an inactive page file in the active/inactive page file memory 96. When the message is a voice message, the caller's message is stored by controller 76 which directs the voice message through the input audio port 84 to an inactive message file located within the voice storage module 82.

When the cellular radiotelephone is not actively engaged in a call, the controller 76 places the paging message in an active page file located either in the active/inactive page file memory 96 or stored voice module 82, depending upon the paging message type. When the controller 76 determines it is time to transmit the paging messages, the controller 76 through digital output bus 86, enables synthesizer 88 to generate either the proper digital address sequence corresponding to the selected portable communication device to be paged, or proper analog address sequence. This address sequence is outputted to transmitter/receiver control 90 to be sent to transmitters 18 for transmission. When the message is stored in the voice storage module 82, the controller 76 enables the message to be recovered through the digital input bus 74. The message is routed through the controller 76 to the output audio bus 92 to transmitter/receiver control 90 to be sent to the transmitters 18 for transmission. The paging message signal corresponding to the address sequence and voice or data message is then transmitted by the transmitters 18.

When the cellular radiotelephone is found to be actively engaged in a call, the controller 76 will then periodically attempt to contact the cellular switch, as described above, at predetermined time intervals, such as once a minute for a predetermined retry period of three to five minutes. The repetition rate for determining the call status of the cellular radiotelephone is determined by such factors as the average minimum length of time for a call on the cellular system, whereas the predetermined retry period is set to the maximum call time interval, or a predetermined time interval after which the paging message is considered by the caller to be "stale". When the cellular radiotelephone message duration exceeds the retry period, the controller 76 deletes the paging message from the active/inactive page file memory 96.

Figure 5:
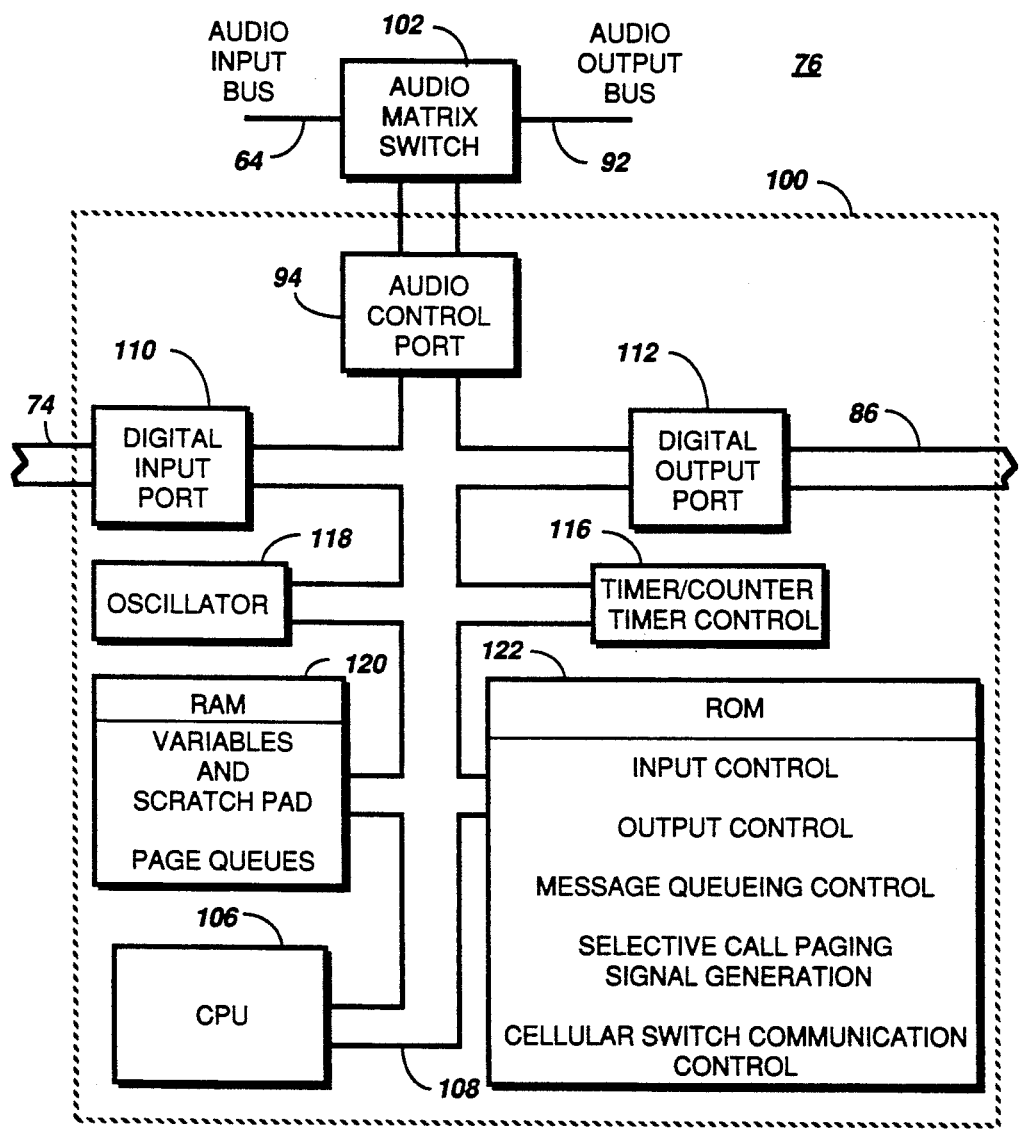
FIG. 5 is an electrical block diagram of the paging terminal controller suitable for use with the present invention.

FIG. 5 is an electrical block diagram of the paging terminal controller 76 suitable for use with the present invention. The controller 76 consists of a microcomputer 100, such as an MC6809 microcomputer manufactured by Motorola, for providing digital control through the digital input bus 74 and the digital output bus 86. The controller 76 also has control of the input audio bus 64 and the output audio bus 92 through the audio matrix switch 102 through the audio control port 94. The microcomputer 100 includes a central processing unit, CPU 106 for operational control. An internal bus 108 connects all the elements of the microcomputer 100. The digital input port 110 couples to the digital input bus 74, the digital output port 112 couples to the digital output bus 86, and the digital audio control port 94 couples to the audio matrix switch 102. The timer/counter 116 is used to generate time intervals required for system operation, such as required to periodically determine the calling status of the cellular radiotelephone and the retry period. The oscillator 118 provides the clock for operation of the CPU 106 and the reference clock for the counter/timer 116. The RAM 120 is used by the CPU 106 and also provides an area for paging queues, such as the active paging files and the inactive paging files. It will be appreciated that depending upon the size of the system, additional RAM or other memory means, such as a hard disk, may be required to provide adequate storage for the paging queues and telephone numbers. The ROM 122 contains the firmware for controlling the microcomputer 100 operation. Included within the ROM 122 are routines providing for input control, output control, message queueing control, selective call paging signal generation, and cellular switch communication control, just to name a few.

Figure 6A:
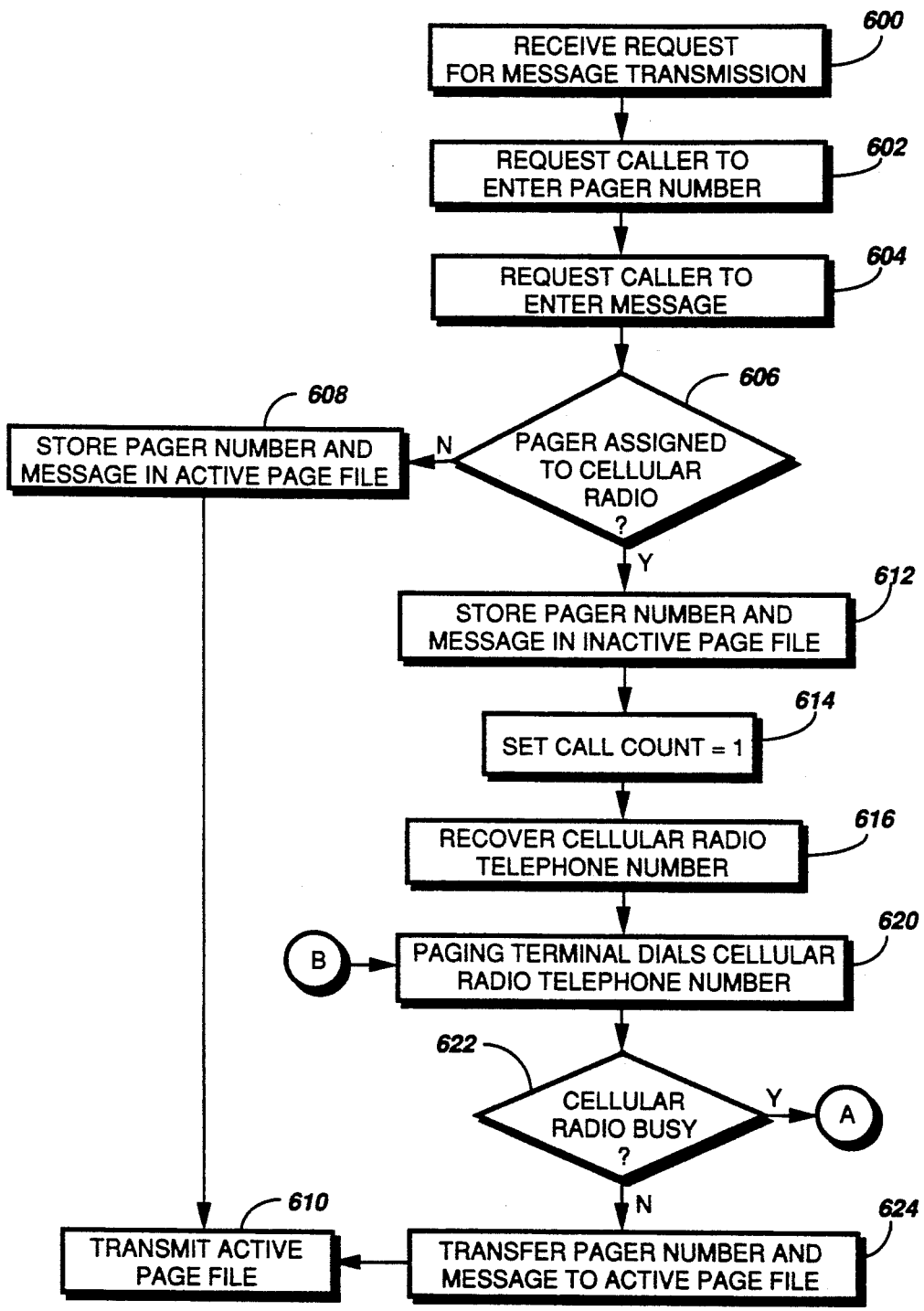
FIGS. 6A and 6B are flow charts describing the operation of a first embodiment of the present invention.
Figure 6B:
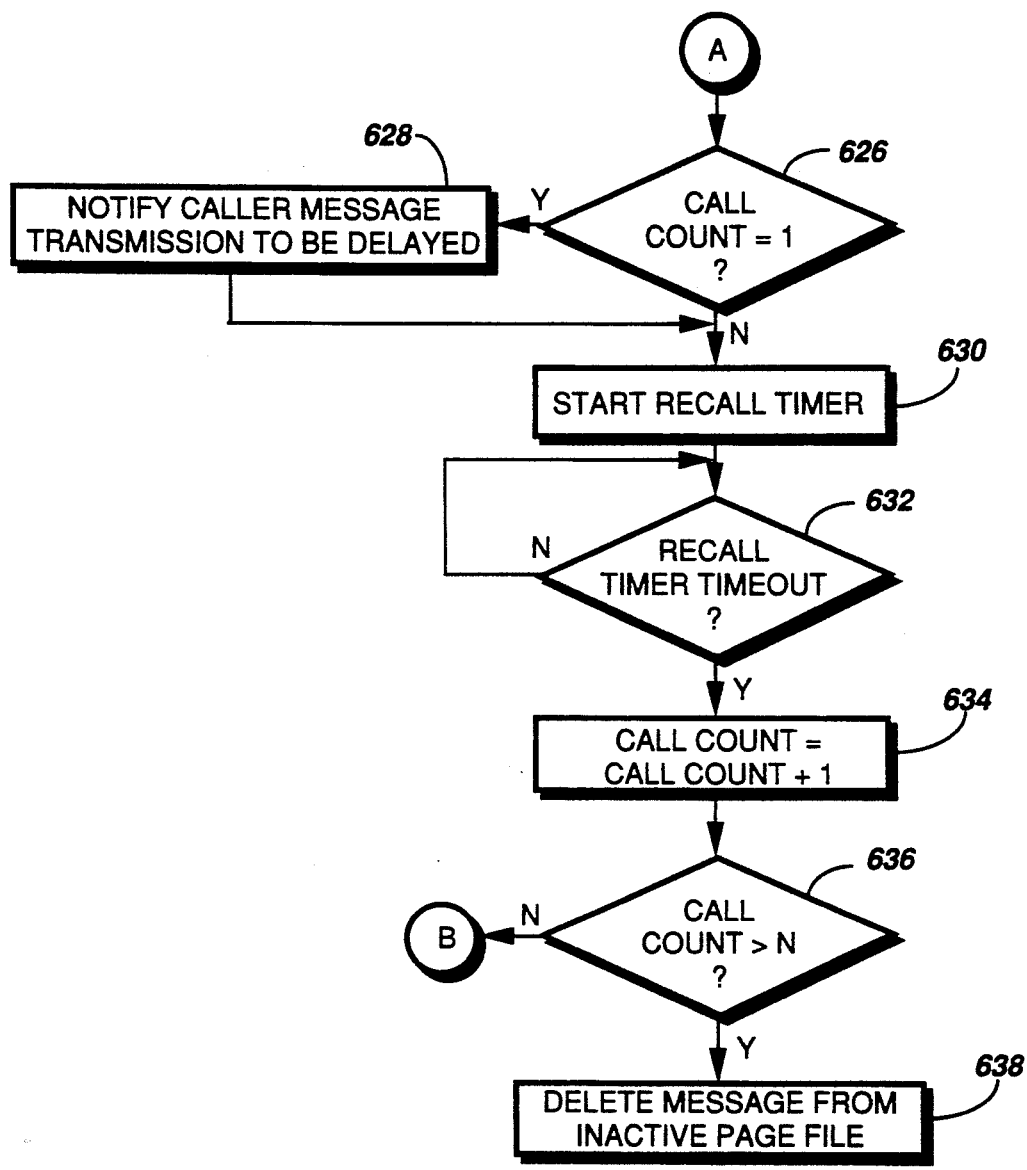

FIGS. 6A and 6B are flow charts describing the operation of a first embodiment of the present invention. In the first embodiment of the present invention, the paging terminal is capable of only indirect communication with the cellular switch. Such communication is provided through the telephone company central office, and uses either a busy signal, or a ring signal, to indicate the calling status of the cellular radiotelephone. When the paging terminal receives a request from a caller to transmit a paging message, at step 600 of FIG. 6A, the paging terminal requests the caller to enter the pager number, at step 602, followed by a request for the caller to enter the message, at step 604. The paging terminal checks the subscriber list, at step 606, to determine if the paging receiver is part of a portable communication device which includes a cellular radiotelephone. When the paging receiver, at step 606 is determined to be a standard paging receiver, the pager number and the paging message are stored in an active page file, at step 608. At the appropriate time, the active page file is transmitted by the paging system, at step 610.

When the paging receiver, at step 606, is determined to be part of a portable communication device which includes a cellular radiotelephone, the pager number and and the message are, at least temporarily, stored in an inactive page file, at step 612. Since the paging terminal may have to repeatedly contact the cellular switch when the cellular radiotelephone is determined to be actively engaged in a call, a call count counter is initialized, at step 614, which in the example shown is set to one. The paging controller recovers the cellular radiotelephone number from the inactive page file, at step 616, directing the information to an input port which generates the appropriate DTMF tones to dial the cellular radiotelephone number, at step 620. When a busy signal is not detected, at step 622, indicating the cellular radiotelephone is not actively engaged in a call, the controller transfers the pager number and the paging message to the active page file, at step 624, after which the paging message is transmitted, at step 610, as described above.

When a busy signal is detected by the controller, at step 622, indicating the cellular telephone is actively engaged in a call, the controller checks if this is the first attempt to contact the cellular radiotelephone, at step 626 of FIG. 6B. When the controller determines this was the first attempt to call the cellular telephone, at step 626, the paging terminal notifies the caller that the message transmission will be delayed for an indeterminate period of time, at step 628. When controller determines this is not the first time an attempt is made to contact the cellular telephone, at step 626, or following notification that the call will be delayed, at step 628, a recall timer is started at step 630. The recall timer determines how frequently the paging terminal attempts to call the cellular radiotelephone. Upon time out of the recall timer, at step 632, the call counter is advanced by one, at step 634, and checked to see if a predetermined number (N) of attempts to call the cellular radiotelephone were made, at step 636. When the recall timer is set to, as for example, one minute, and N=5, then the retry period corresponds to a five minute time interval. When the call count is below the predetermined call count, at step 636, the controller again attempts to contact the cellular radiotelephone, at step 620, repeating the steps of 616–636 as described above, or until the paging message is delivered. When the call count exceeds the predetermined call count, at step 636, indicating the paging message is now "stale" the paging message is deleted from the inactive page file, at step 638.

Figure 7A:
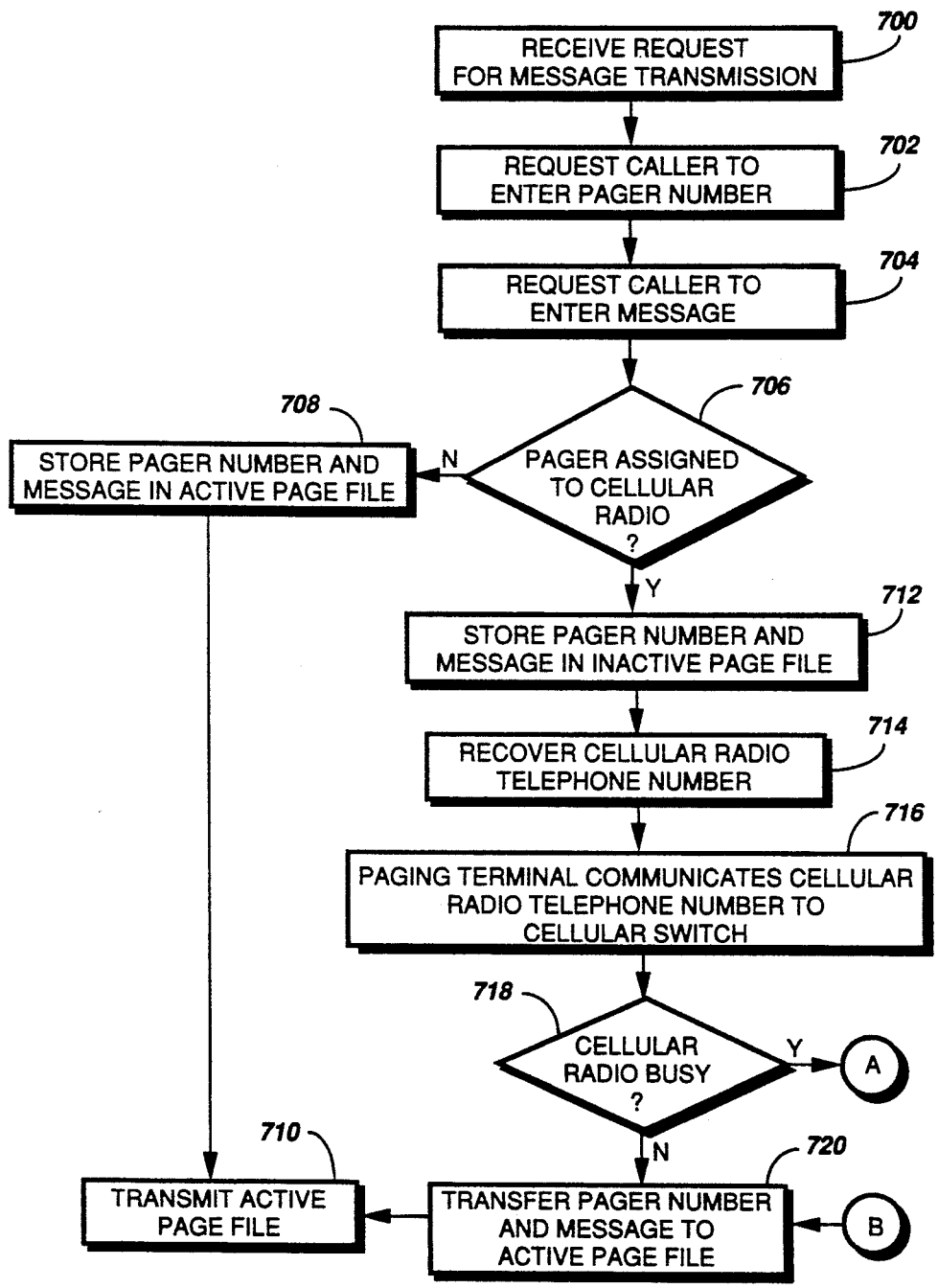
FIGS. 7A and 7B are flow charts describing the operation of a second embodiment of the present invention.
Figure 7B:
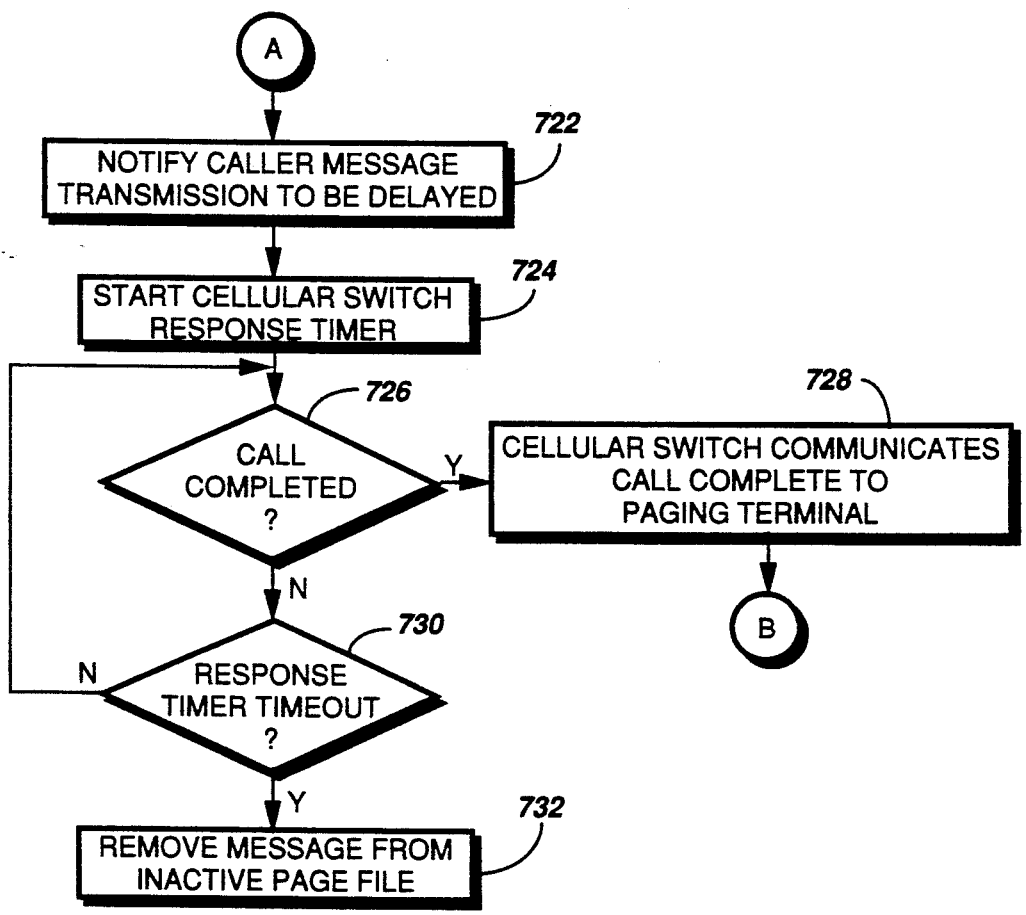

FIGS. 7A and 7B are flow charts describing the operation of a second embodiment of the present invention. In the second embodiment of the present invention, the paging terminal is capable of direct communication with the cellular switch. When the paging terminal receives a request from a caller to transmit a paging message, at step 700 of FIG. 7A, the paging terminal requests the caller to enter the pager number, at step 702, followed by a request for the caller to enter the message, at step 704. The paging terminal checks the subscriber list, at step 706, to determine if the paging receiver is part of a portable communication device which includes a cellular radiotelephone. When the paging receiver, at step 706 is determined to be a standard paging receiver, the pager number and the paging message are stored in an active page file, at step 708. At the appropriate time, the active page file is transmitted by the paging system, at step 710.

When the paging receiver, at step 706, is determined to be part of a portable communication device which includes a cellular radiotelephone, the pager number and and the message are, at least temporarily, stored in an inactive page file, at step 712. The paging controller next recovers the cellular radiotelephone number from the inactive page file, at step 714, and communicates the cellular radiotelephone number to the cellular switch, at step 716. When a busy signal is not generated by the cellular switch, at step 718, indicating the cellular radiotelephone is not actively engaged in a call, the controller transfer the pager number and the paging message to the active page file, at step 720, after which the paging message is transmitted, at step 710, as described above.

When a busy signal is generated by the cellular switch, at step 718, indicating the cellular telephone is actively engaged in a call, the paging terminal notifies the caller that the message transmission will be delayed for an indeterminate period of time, at step 722 of FIG. 7B. A response timer is started, at step 724, which corresponds to the maximum holding time the paging message will be stored before the message is considered to be "stale". The cellular switch monitors the progress of the call to the cellular radiotelephone, at step 726. When the call to the cellular radiotelephone is completed, at step 726, the cellular switch re-establishes a communication link between the paging terminal controlling the paging message delivery and communicates a call complete signal to the paging terminal, at step 728, and transmits to the paging terminal, the identification of the paging receiver portion of the portable communication device to provide an indication the personal communication transceiver has completed the call. The paging message is then transferred from the inactive page file to the active page file, at step 720 of FIG. 7A, after which the paging message is transmitted, at step 710.

During the time the paging terminal is awaiting a call complete signal from the cellular switch, at step 726 of FIG. 7B, the response timer is monitored to determine when the response timer times out, at step 730. When the response timer times out, at step 730, indicating the paging message is now "stale" the paging message is deleted from the inactive page file, at step 732.

A method and apparatus has been described for reliably transmitting a paging message to a paging receiver which is combined with a cellular radiotelephone in a common portable communication device. The method and apparatus described above provide reliable paging message transmission without the use of excessive paging system air time which would be encountered when the paging message transmissions are repeated on the paging system to insure message delivery.

While specific embodiments of this invention have been shown and described, further modifications and improvements will occur to those skilled in the art. All modifications which retain the basic underlying principles disclosed and claimed herein are with the scope and spirit of the present invention.

We claim:

1. In a communication system utilizing a portable communication device combining a personal communication transceiver and a paging receiver, a method for delivering a paging message to the paging receiver comprises the steps of:
   detecting when a call is in progress with the personal communication transceiver portion of the portable communication device for which a paging message to the paging receiver is intended;
   inhibiting the transmission of the paging message to the paging receiver during the call to the personal communication transceiver; and
   delivering the paging message to the paging receiver upon termination of the call to the personal communication transceiver.

2. The method according to claim 1 wherein the step of detecting comprises said steps of:
   establishing a communication link between the paging terminal controlling the paging message delivery and the cellular switch controlling the call delivery;
   generating a request by the paging terminal to communicate with the personal communication transceiver portion of the portable communication device; and
   detecting a busy indication indicating a call is in progress with the personal communication transceiver.

3. The method according to claim 2 further comprising the step of re-establishing, at predetermined time intervals, the communication link between the paging terminal and the cellular switch for detecting the termination of the call to the personal communication transceiver.

4. The method according to claim 1 further comprising the steps of:
   establishing a communication link between the paging terminal controlling the paging message delivery and the cellular switch controlling the call delivery;
   communicating, to the cellular switch from the paging terminal, the identification of the personal communication transceiver portion of the portable communication device for which a message is intended; and
   communicating, to the paging terminal from the cellular switch, an indication the personal communication transceiver is engaged in a call.

5. The method according to claim 4 further comprising the steps of:
   re-establishing a communication link between the paging terminal controlling the paging message delivery and the cellular switch controlling the call delivery; and
   communicating, to the paging terminal from the cellular switch, the identification of the paging receiver portion of the portable communication device to provide an indication the personal communication transceiver has completed the call.

6. The method according to claim 1 further comprising the step of storing within the paging terminal in an inactive page file the paging message when a call is detected which is placed to the portable communication device for which the paging message is intended.

7. The method according to claim 1 further comprising the steps of:
   receiving a request for the transmission of a message to the paging receiver portion of the portable communication device;
   determining whether a call is in progress with the personal communication transceiver; and
   transmitting the paging message when a call is not in progress with the personal communication transceiver portion of the portable communication device.

8. In a communication system, comprising a paging terminal for paging message delivery to a paging receiver and a cellular switch for call delivery to a personal communication transceiver, and utilizing a portable communication device combining the personal communication transceiver and the paging receiver, an apparatus for delivering a paging message to the paging receiver comprises:
   means for detecting when a call is in progress with the personal communication transceiver portion of the portable communication device for which a paging message to the paging receiver is intended;
   means for inhibiting the transmission of the paging message to the paging receiver during the call to the personal communication transceiver; and
   means for delivering the paging message to the paging receiver upon termination of the call to the personal communication transceiver.

9. The apparatus for delivering the paging message according to claim 8 wherein said means for detecting a call comprises:
   means for establishing a communication link between the paging terminal controlling the paging message delivery and the cellular switch controlling the call delivery;
   means for generating a request by the paging terminal to communicate with the personal communication transceiver portion of the portable communication device; and means for detecting a busy indication which indicates that a call is in progress with the personal communication transceiver.

10. The apparatus for delivering the paging message according to claim 9 further comprising:

means for generating timing signals; and means, responsive to the timing signals, for reestablishing at predetermined time intervals, the communication link between the paging terminal and the cellular switch for effecting the detection of the termination of the call to the personal communication transceiver.

11. The apparatus for delivering the paging message according to claim 8 further comprising:

means, within the paging terminal, for establishing a communication link between the paging terminal controlling the paging message delivery and the cellular switch controlling the call delivery;

means for communicating, to the cellular switch from the paging terminal, the identification of the personal communication transceiver portion of the portable communication device for which a message is intended; and means for communicating, to the paging terminal from the cellular switch, an indication that the personal communication transceiver is engaged in a call.

12. The apparatus for delivering the paging message according to claim 11 further comprising:

means, within the cellular switch, for re-establishing the communication link between the paging terminal controlling the paging message delivery and the cellular switch controlling the call delivery; and means for communicating, to the paging terminal from the cellular switch, the identification of the paging receiver portion of the portable communication device to provide an indication that the personal communication transceiver has completed the call.

13. The apparatus for delivery the paging message according to claim 8 further comprising means for storing the paging message within the paging terminal in an inactive page file when a call is detected which is in progress with the portable communication device for which the paging message is intended.

14. The apparatus for delivering the paging message according to claim 8 further comprising:

means for receiving a request for the transmission of a message to the paging receiver portion of the portable communication device;

means for determining whether a call is in progress with the personal communication transceiver; and means for transmitting the paging message when a call is not in progress with the personal communication transceiver portion of the portable communication device.

15. The apparatus for delivering the paging message according to claim 8 wherein the personal communication device is a cellular telephone.

16. The apparatus for delivering the paging message according to claim 8 wherein the personal communication device is a CT2 handset.

* * * * *